United States Patent
Schmid et al.

[11] Patent Number: 5,983,615
[45] Date of Patent: Nov. 16, 1999

[54] WINDROWER PLATFORM SIDE-TO-SIDE FLOAT BALANCE ADJUSTMENT

[75] Inventors: Steven Lawrence Schmid, Agency; Michael James Mellin; Frederick Carl Krambeck, both of Ottumwa, all of Iowa

[73] Assignee: Deere & Company, Moline, Ill.

[21] Appl. No.: 09/185,434

[22] Filed: Nov. 3, 1998

[51] Int. Cl.⁶ .................................................. A01D 67/00
[52] U.S. Cl. ..................... 56/208; 56/DIG. 1; 56/DIG. 11
[58] Field of Search ....................... 56/DIG. 1, DIG. 11, 56/11.9, 208; 248/631; 403/13, 14

[56] References Cited

U.S. PATENT DOCUMENTS

| | | | |
|---|---|---|---|
| 3,397,520 | 8/1968 | Johnston et al. | 56/DIG. 1 |
| 3,402,532 | 9/1968 | Johnston et al. | 56/DIG. 1 |
| 3,474,601 | 10/1969 | Burrough et al. | |
| 3,625,537 | 12/1971 | Bornzin | 280/80 R |
| 3,672,135 | 6/1972 | Peacock et al. | 56/14.2 |
| 3,699,754 | 10/1972 | Koch et al. | 56/DIG. 1 |
| 3,717,995 | 2/1973 | Case. | |
| 3,835,629 | 9/1974 | Rosendahl et al. | 56/14.4 |
| 3,913,975 | 10/1975 | Carter | 297/307 |
| 4,133,165 | 1/1979 | Hoch | 56/DIG. 1 |
| 4,175,366 | 11/1979 | Cicci | 56/DIG. 1 |
| 4,206,582 | 6/1980 | Molzahn et al. | 56/DIG. 1 |
| 4,472,927 | 9/1984 | Vogt et al. | 56/16.4 |
| 4,724,661 | 2/1988 | Blakeslee et al. | 56/DIG. 1 |
| 4,949,535 | 8/1990 | Hurlburt | 56/DIG. 1 |
| 4,961,303 | 10/1990 | McCarty et al. | 56/DIG. 1 |
| 5,033,257 | 7/1991 | Walters | 56/16.4 |
| 5,531,062 | 7/1996 | Pfrimmer | 56/DIG. 1 |
| 5,778,644 | 7/1998 | Keller et al. | 56/11.2 |

*Primary Examiner*—Thomas B. Will
*Assistant Examiner*—Arpad Fabian Kovacs

[57] ABSTRACT

A harvester platform is suspended from the implement main frame by a linkage including a pair of lower transversely spaced links each having rear and front ends respectively pivotally attached to the main frame and the platform. Associated with each lower suspension link is a hydraulic float cylinder coupled between the main frame and the associated link so as to exert a lifting force on the link. The amount of lifting force exerted by each float cylinder may be varied by adjusting the location of the anchor pin connecting the cylinder to the main frame through means of an adjustable bracket that carries the anchor pin. Side-to-side float balance of the platform is achieved through properly adjusting the anchor pin locations so that the float cylinder at the heavier end of the platform exerts a greater lifting force than the float cylinder at the lighter end of the platform.

10 Claims, 3 Drawing Sheets

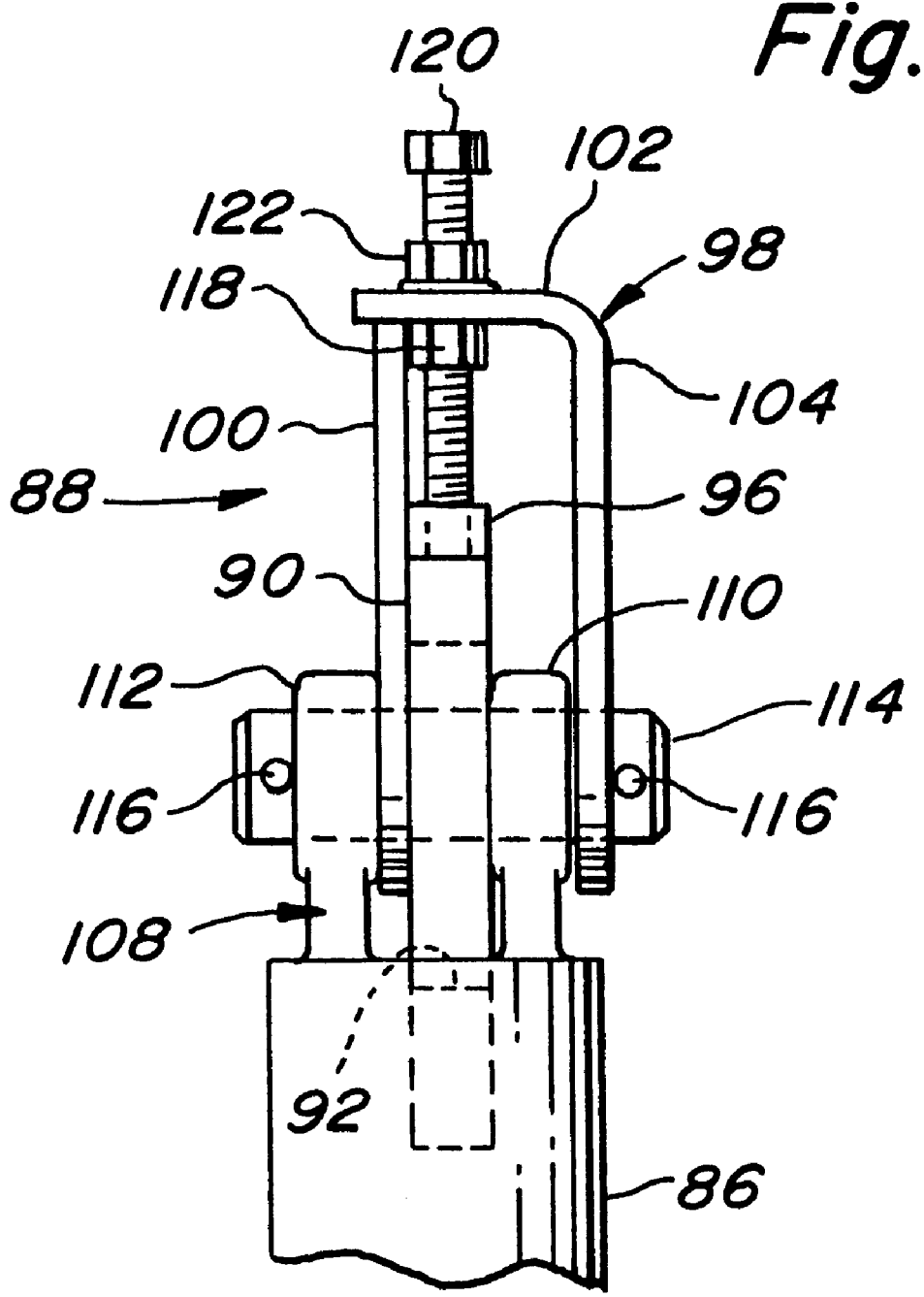

WINDROWER PLATFORM SIDE-TO-SIDE FLOAT BALANCE ADJUSTMENT

BACKGROUND OF THE INVENTION

The present invention relates to harvesting platforms for agricultural implements, and more specifically relates to a way of adjusting the float characteristics of a platform equipped with a hydraulic float system comprising a pair of float cylinders at opposite sides of the platform which are connected to an accumulator.

Heretofore, a problem with hydraulic cylinder/ accumulator platform float systems is that due to the side-to-side weight balance of different platforms and platforms equipped with different options being unequal the side-to-side float balance is not equal. This uneven float causes problems on hill sides and in wet field conditions.

SUMMARY OF THE INVENTION

According to the present invention there is provided an improved harvesting platform float system.

An object of the invention is to provide a hydraulic float system for a harvester platform which may be adjusted to compensate for side-to-side weight unbalance of the platform.

A more specific object of the invention is to provide an adjustable mounting for first ends of a pair of float cylinders of a hydraulic float system for a harvesting platform, the adjustable mounting making it possible to change the geometry of the cylinders such that the amount of float force exerted by the individual cylinders is different so as to compensate for side-to-side weight unbalance.

These and other objects will become more apparent from a reading of the ensuing description together with the appended drawings.

BRIEF DESCRIPTION OF THE DRAWINGS

FIG. 2 is a front elevational view, with parts broken away, showing the left side float cylinder with its adjustable mounting bracket.

DESCRIPTION OF THE PREFERRED EMBODIMENT

Preliminarily, it is to be noted that terms such as "right" and "left" as used herein are made in accordance with the view point of a person standing behind the implement and facing in the direction of forward travel. Also, some elements are described as occurring in pairs when only one of the two is shown, it to be understood that the unshown element is identical to or a mirror image of the one shown.

Figure 1:
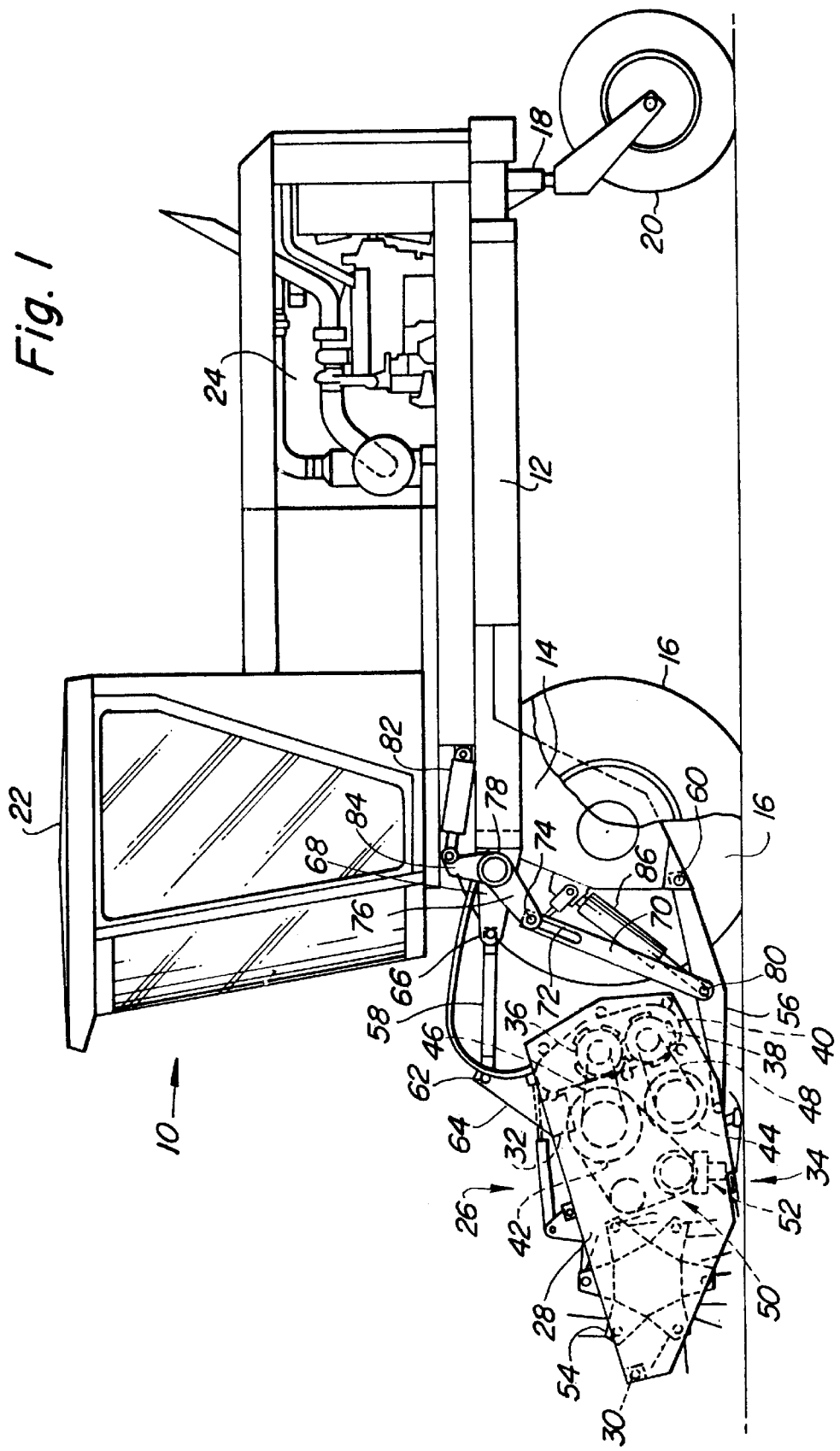
FIG. 1 is a left side elevational view of a self-propelled windrower including a harvesting platform of the type with which the present invention is particularly adapted for use.

Referring now to FIG. 1 there is shown a self-propelled windrower 10 including a main frame 12 including a pair of wheel support structures 14 at its forward end respectively to which are mounted a pair of transversely spaced drive wheels 16. An axle 18 extends transversely at a rear portion of the frame 12 and is connected thereto for swinging about a horizontal longitudinal pivot axis established by a mounting (not shown) between a mid-point of the axle and the frame 12. Respectively mounted to opposite ends of the axle 18 are a pair of caster-mounted wheels 20. An operator's cab 22 is mounted to an upper forward location of the frame 12 and contains various controls (not shown) for the windrower. An internal combustion engine 24 is mounted on a rear section of the frame 12 and provides the power for driving all of the driven components associated with the windrower.

A platform or header 26 is suspended from the frame 12 for floating vertically during cutting operation and for being moved vertically between a raised transport position and a lowered working position. The platform or header 26 may take a variety of forms but for the purposes of this application is disclosed as being that which is disclosed and described in detail in U.S. Pat. No. 5,778,644, issued Jul. 14, 1998 and assigned to the assignee of this application.

Specifically, the platform 26 includes opposite, transversely spaced outer side walls 28, here shown including cover structure enclosing certain drive components, and being joined at upper front locations by a knock-down bar 30, at upper rear locations by a cross beam 32, and at lower central locations by a sickle cutterbar assembly 34. Respectively spaced inwardly from, and extending parallel to rear sections of the outer walls 28 are a pair of transversely spaced inner side walls (not visible). Extending between and rotatably supported by the inner side walls are upper and lower conditioner rolls 36 and 38, respectively. Power for driving the conditioner rolls is supplied by a reversible hydraulic motor, not shown, coupled to a gear train located within a gear case 40 that is secured to an outer surface of the left-hand side wall 28. Extending between and having stub shafts their opposite ends respectively supported by the pair of side walls 28 at locations forwardly of the conditioner rolls 36 and 38 are upper and lower, center-feed augers 42 and 44, respectively, which are respectively driven by upper and lower chain-and-sprocket arrangements 46 and 48 coupled between respective stub shafts of the upper conditioner roll 36 and the upper auger 42, and between respective stub shafts of the lower conditioner roll 38 and the lower auger 44. Timing or cog belt and sprocket drive assemblies 50 are provided at the exterior of each side wall 28 and are respectively coupled between stub shafts at opposite ends of the upper auger 42 and the respective input shafts of a pair of wobble drive boxes 52 having respective drive arms coupled between output shafts thereof and to outer ends of a pair of transverse, overlapping, reciprocably mounted sicklebars, not shown, forming part of the cutterbar assembly 34. A reel 54 extends between and is rotatably supported by the pair of outer side walls 28 at respective locations forwardly of the cutterbar assembly 34, the reel 54 being driven, in a manner not disclosed, for causing it to rotate counterclockwise, as viewed in FIG. 1, for sweeping crop against the sicklebars for being cut and then toward augers 42 and 44.

The header or platform 26 is suspended from a forward end of the frame 12 by a pair of lower links 56 and a central upper link 58. Specifically, the pair of lower links 56 have rear ends respectively vertically pivotally mounted, as by respective coupling pins 60, to lower ends of the wheel support structures 14 and have forward ends pivotally connected to supports, not visible, forming part of the platform 26. The upper link 58 has its front end pivotally coupled, as at pin 62, to a bracket 64, fixed to a location of the cross beam 32 approximately halfway between its opposite ends, and has its rear end pivotally coupled, as at pin 66, to a main frame bracket 68. A pair of lift links 70, each comprising a pair of identical straps, have upper ends provided with respective lost motion slots 72 receiving pins 74 coupling the links 70 to forward ends of respective crank arms 76 of a rockshaft 78, and have lower ends pivotally coupled, as at pins 80, to middle locations of the lower links 56. The rockshaft 78 is rotatably mounted to an upper forward location of the frame 12 and a lift cylinder 82 is connected between the frame 12 and an arm 84 fixed to the rockshaft 78. Coupled between each lower link 56 and the adjacent wheel support structure 14 is a float cylinder 86, the cylinders being coupled in any known hydraulic circuit including an accumulator which acts to create equal forces in the cylinders 86.

To this point, everything described concerning the windrower 10 is conventional. The following description contains the present invention.

Figure 4:
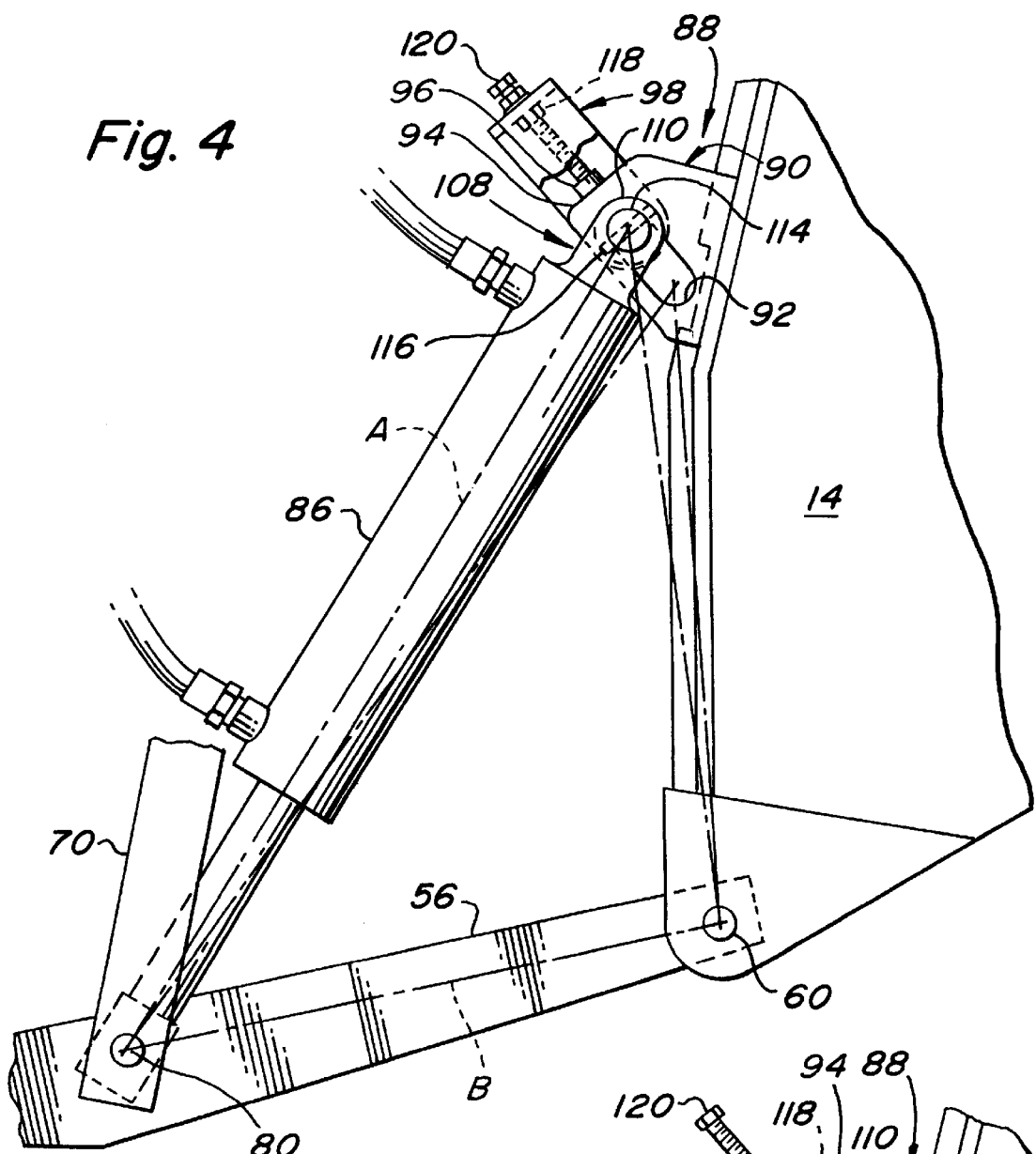
FIG. 4 is a view like FIG. 3 but showing the mounting bracket in a second extreme position of adjustment.
Figure 3:
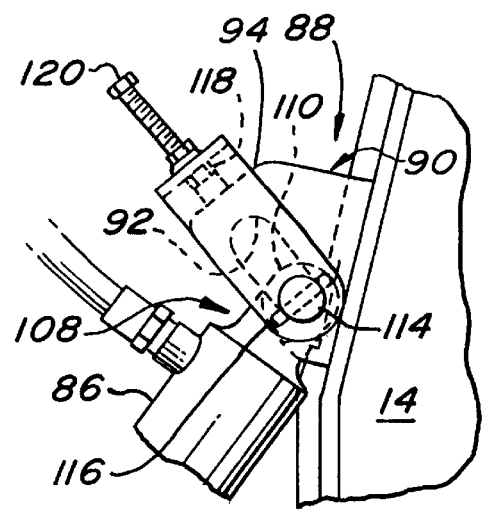
FIG. 3 is a left side elevational view showing the left side float cylinder adjustable mounting bracket in a first extreme position of adjustment.

Referring now also to FIGS. 2–4, it can be seen that the upper end of the right-hand float cylinder 86 is mounted to a mounting bracket assembly 88 comprising a flat, vertical plate 90 having a first straight edge welded to a front surface of the right-hand wheel support structure 14. An adjustment slot 92 extends upwardly and forwardly in the plate 90. Welded to an upwardly and forwardly facing edge 94 of the plate 90 at a location in alignment with a major axis of the slot 92 is a positioning ring 96. A clevis 98 is formed from welding a straight strap, forming a first leg 100, to a short leg of an L-shaped strap such that the short leg forms a bight 102 and the long leg forms a second leg 104 extending in spaced parallel relationship to the first leg 100. The clevis legs 100 and 104 are provided with respective axially aligned holes and are located in straddling relationship to the plate 90 with the holes contained in the legs being aligned with the slot 92. A bifurcated mounting lug 108 at the upper end of the float cylinder 86 has first and second parts 110 and 112, respectively, containing aligned bores, with the first part 110 being located between the plate 90 and the clevis leg 104 and with the second part 112 being located on the opposite side of the first clevis leg 100 from the plate 90. The mounting lug 108 of the cylinder 86 and the clevis legs 100 and 104 are mounted to the plate 90 by an anchor pin 114 that is received in the adjustment slot 92 of the plate 90 and extends through the mounting holes provided in the mounting lug and clevis legs. The anchor pin 114 is held in place by a pair of retaining pins 116 provided in cross bores at the opposite ends of the anchor pin 114. The bight 102 of the clevis 98 contains a hole that is aligned with the locator ring 96 and welded to the underside of the bight 102 in alignment with the hole is a threaded nut 118. A threaded adjustment bolt 120 is threaded through the nut 118 and has a lower end received in the locator ring 96. A jam nut 122 is located on the bolt 120 on the opposite side of the clevis bight 102 from the welded nut 118.

It is noted that, in operation, the cylinders 86 at the opposite sides of the platform 26 are incorporated in a hydraulic circuit together with an accumulator in a known manner which results in each of the cylinders 86 containing the same pressure acting on the cylinder piston to exert a lifting force on the lower suspension links 56 so as to reduce the weight of the platform that is supported on skids located beneath the platform. Because equal pressure is present in the cylinders 86, the lifting force exerted on the links 56 by each cylinder is equal when the lines of action A of the pair of cylinders bear the same geometrical relationship respectively to the pair of centerlines B connecting the pins 60 and 80 associated with the links 56. Then, in instances where one side of the platform is heavier than the other, the skids at the heavier side tends to dig increasing the chances of damage or uneven cutting, this condition being intensified when working on hill sides with the heaviest side of the platform 26 being lower than the other side.

It will be appreciated that the operation of the invention involves the adjustability of the anchor point of the upper end of each float cylinder 86 so as to change its line of action A relative to the centerline B through the attachment pins 60 and 80 of the associated suspension link 56. Specifically, referring to FIG. 2, the location of the cylinder anchor pin 114 can be adjusted by loosening the jam nut 122 and turning the adjustment bolt 120 one way or the other to cause the anchor pin 114 to move either upwardly or downwardly in the slot 92, the major axis of which extends cross ways to the line of action A of the cylinder 86. FIG. 3 shows the anchor pin 114 in its extreme lower position in the slot 92 and in that position the line of action A of the cylinder 86 will be such as to exert a minimum lifting force on the link 56. FIG. 4 shows the anchor pin 114 in its extreme upper position in the slot 92 and in that position the line of action of the cylinder 86 will be such as to exert a maximum lifting force on the link 56. Accordingly, by changing the lines of action of the pair of float cylinders 86 by adjusting their upper anchor points, side-to-side float balance of the platform 26 may be achieved, the necessity for such an adjustment coming about due to changes in header types, e.g., one equipped with a rotary cutterbar, thus, requiring a different drive system than that disclosed here, or changes in header options, e.g., one equipped with an impeller conditioner, thus, also requiring a drive differing from that disclosed here.

We claim:

1. An adjustable cylinder anchor pin mounting bracket, comprising: a vertical plate fixed to a base member and including an edge; an elongate hole extending horizontally through said plate and having a major axis extending perpendicular to said edge of said plate; a clevis having a pair of parallel legs straddling said plate and having a bight disposed in parallel relationship to said edge of said plate; said legs being provided with respective axially aligned holes which are aligned with said elongate hole; a cylinder anchor pin extending through the holes in said pair of legs and through said elongate hole in said plate; and a threaded adjustment bolt extending through and being threadedly received in said bight and having an end engaged with said edge of said plate whereby advancing or retracting said bolt relative to said bight will result in said anchor pin moving between opposite ends of said slot.

2. The adjustable cylinder anchor pin bracket defined in claim 1 wherein a locating ring is welded to said edge of said plate in surrounding relationship to said end of said adjustment bolt.

3. The adjustable cylinder anchor pin bracket defined in claim 1 wherein said bight includes a nut welded thereto and said adjustment bolt being threaded through said nut.

4. The adjustable cylinder anchor pin bracket as defined in claim 3, and further including a jam nut located on said adjustment bolt on an opposite side of said bight from said first named nut.

5. In a harvesting device including a main frame and a harvesting platform extending transversely to a normal direction of travel and suspended from the main frame by a float linkage including a pair of transversely spaced lower links each extending between the main frame and the platform, and a hydraulic float cylinder associated with each link and having its opposite ends respectively pivotally coupled to the main frame and to an associated one of said lower links by first and second anchor pins, the improvement comprising: a cylinder anchor assembly associated with at least one end of each float cylinder and including an adjustable anchor pin carrier selectively movable to a plurality of adjusted positions in a direction transverse to a direction of action of the float cylinder, whereby adjustment of the anchor pin carrier results in a change in the direction of action of the float cylinder thereby increasing or decreasing the amount of lifting force exerted by the cylinder on the associated lower link.

6. The harvesting machine defined in claim 5 wherein each cylinder anchor assembly is associated with a respective one of said first cylinder anchor pins and comprises a vertical plate fixed to and projecting forwardly from said main frame; said plate having an upper edge extending generally parallel to said direction of action of the associated float cylinder; said vertical plate containing an elongate adjustment slot having a major axis extending generally perpendicular to said upper edge; said anchor pin carrier being a U-shaped member having a pair of legs disposed in straddling relationship to said plate and joined together by a bight extending generally parallel to said edge; a cylinder anchor pin extending through and being mounted in said legs and being received in said adjustment slot; a threaded adjustment bolt being received in a threaded hole provided in said bight and having an end engaged with said edge, whereby screwing the bolt one way or the other in said threaded hole results in the anchor pin carrier moving so as to move said anchor pin along said major axis of said adjustment slot.

7. The harvesting device defined in claim 6 wherein said edge of said plate is provided with a blind opening receiving an end of said anchor bolt.

8. The harvesting device defined in claim 7 wherein said blind opening is defined by a ring fixed to said edge.

9. The harvesting device defined in claim 6 wherein a nut is welded to said bight and provides the threaded opening in which said adjustment bolt is received.

10. The harvesting device defined in claim 9 and further including a jam nut located received on said adjustment bolt on an opposite side of said bight from said first-named nut.

* * * * *